July 25, 1939.  H. F. SMITH  2,167,394

REFRIGERATING APPARATUS

Filed Dec. 27, 1933  4 Sheets-Sheet 2

INVENTOR
Harry F. Smith
BY
Spencer Hardman and Teho
ATTORNEYS

July 25, 1939. H. F. SMITH 2,167,394
REFRIGERATING APPARATUS
Filed Dec. 27, 1933 4 Sheets-Sheet 3
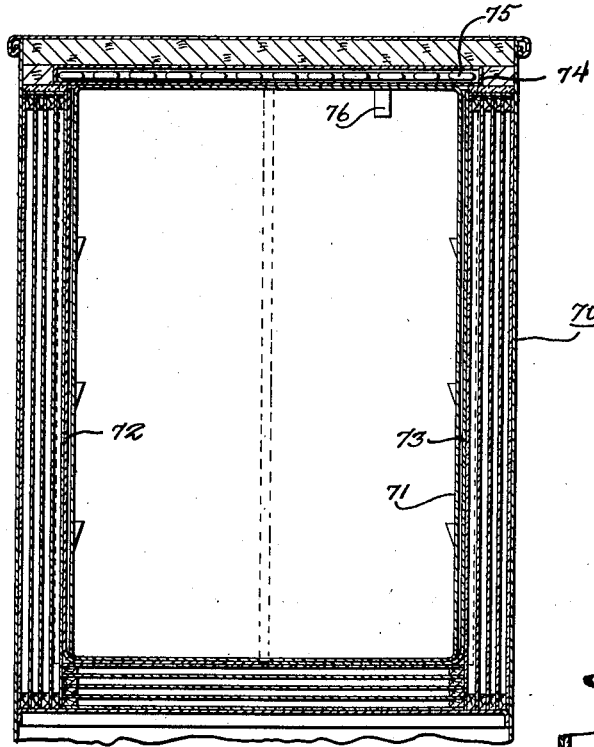
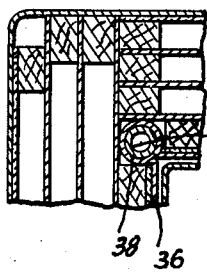
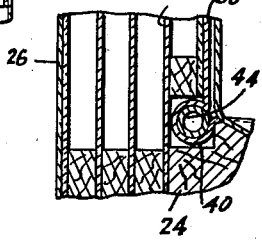
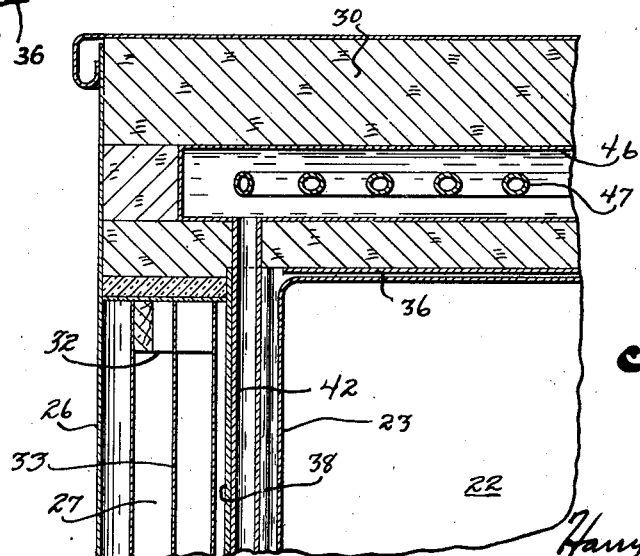
INVENTOR
Harry F. Smith
BY
Spencer Hardman & Fehr
ATTORNEYS July 25, 1939. H. F. SMITH 2,167,394
REFRIGERATING APPARATUS
Filed Dec. 27, 1933 4 Sheets-Sheet 4

INVENTOR
Harry F. Smith
BY
Spencer Hardman and Fehr
ATTORNEYS

Patented July 25, 1939

2,167,394

UNITED STATES PATENT OFFICE 2,167,394

REFRIGERATING APPARATUS

Harry F. Smith, Dayton, Ohio, assignor to General Motors Corporation, Dayton, Ohio, a corporation of Delaware Application December 27, 1933, Serial No. 704,151

13 Claims. (Cl. 62—116)

This invention relates to refrigerating apparatus and more particularly to refrigerating apparatus in which a refrigerator cabinet is cooled.

Heretofore it has been customary to provide in a refrigerator a food compartment lining and insulation surrounding the food compartment lining. In order to maintain the cabinet cool, an evaporator has been provided within the food compartment to take care of the heat leakage through the walls of the cabinet into the food compartment and also to cool the food stuffs placed within the compartment, as well as any air which may enter the food compartment when the door is open. By this scheme because of the indirect heat transfer relationships it is necessary to maintain the evaporator at a lower temperature than the food need be kept in order to absorb all the heat which enters the cabinet. This causes a number of undesirable conditions, such as inefficient operation of the refrigerating apparatus, the collection or accumulation of frost upon the cooling unit and the dehydration of foods within the food compartment.

Inasmuch as the greater portion of the heat entering the cabinet is through leakage through the walls of the cabinet, it is an object of my invention to provide means for intercepting this heat leakage before it enters the food compartment and particularly before it reaches the food compartment liner.

It is a further object of my invention to provide such a heat intercepting and removing means which will be readily removable from the cabinet independently of the inner liner and certain other portions of the cabinet.

Further objects and advantages of the present invention will be apparent from the following description, reference being had to the accompanying drawings, wherein a preferred form of the present invention is clearly shown.

In the drawings:

Fig. 3 is a sectional view taken on the line 3—3 of Fig. 2;

Fig. 5 is a vertical sectional view showing a modified form of my invention;

Fig. 9 is an enlarged horizontal sectional view of the rear corner of the cabinet shown in Figs. 1 to 5 inclusive showing one of the loops of the intercepting plates.

Fig. 10 is a horizontal sectional view of one of the front corners of the refrigerator cabinet shown in Figs. 1 to 5 inclusive showing the curled edge portion of one of the intercepting plates.

Figure 1:
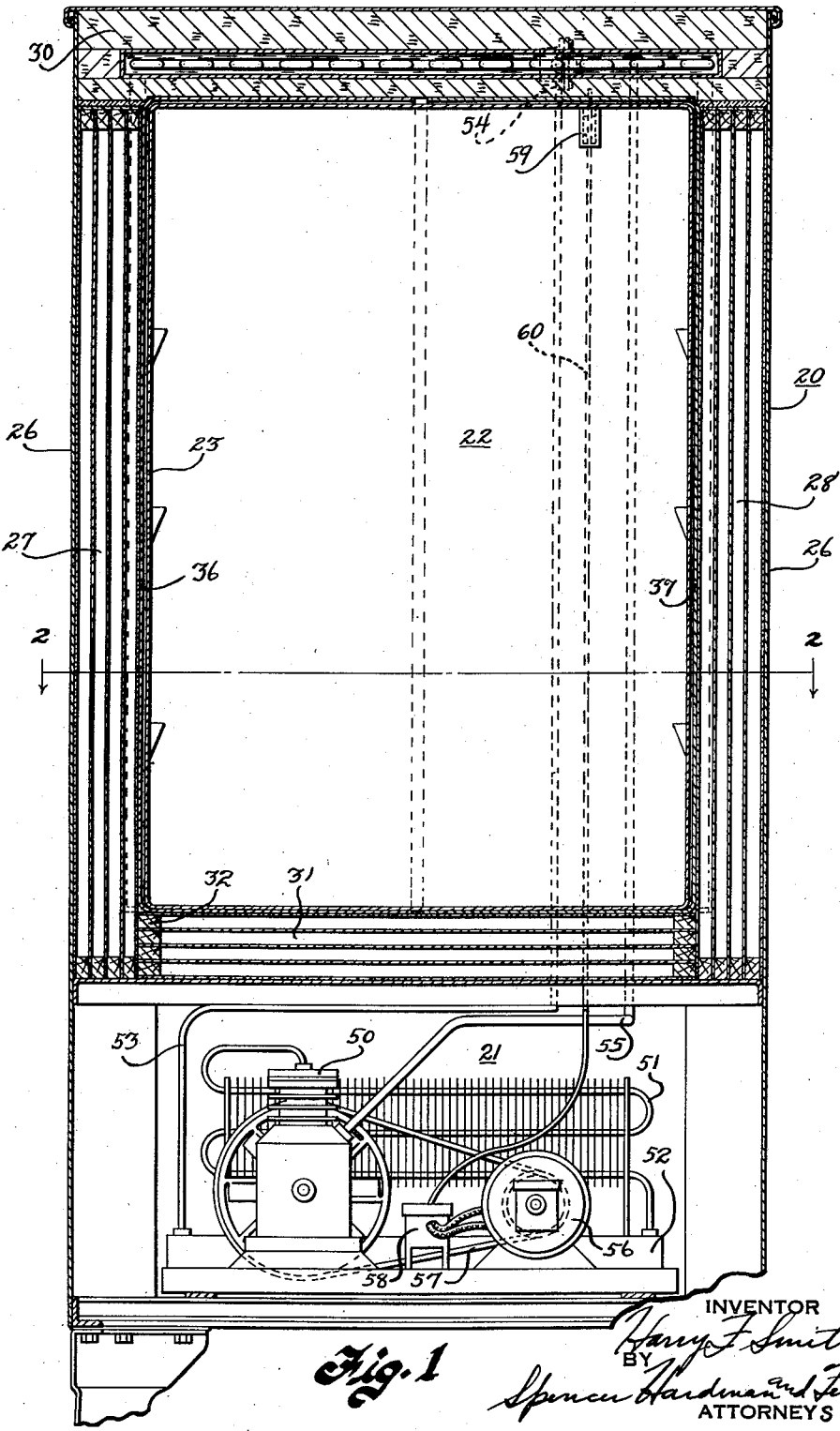
Fig. 1 is a vertical sectional view of one form of my invention taken on the line 1—1 of Fig. 2.
Figure 2:
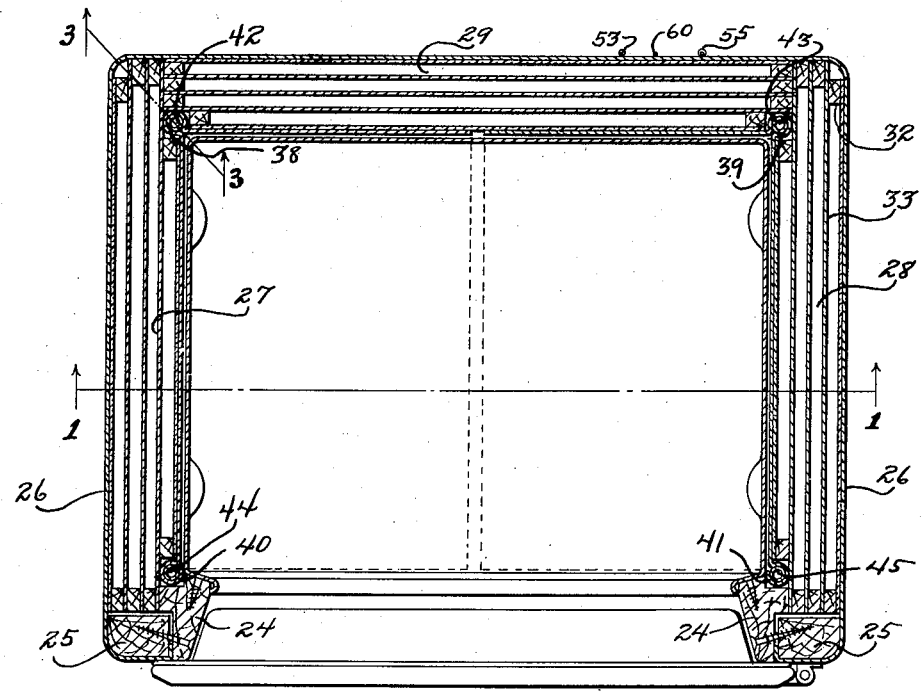
Fig. 2 is a sectional view on the line 2—2 of Fig. 1.
Figure 4:
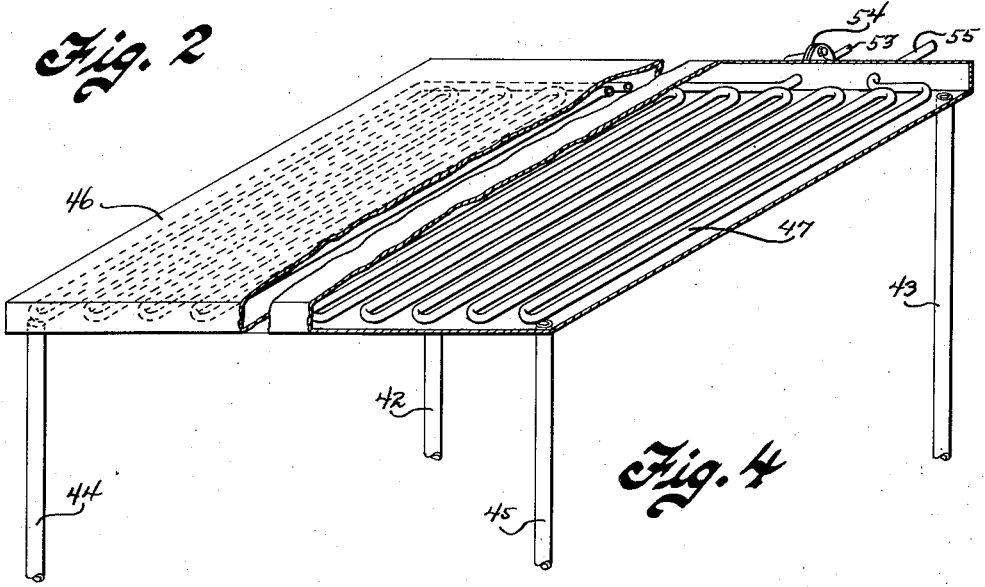
Fig. 4 is a perspective view of the heat interchanging portion of the primary and secondary refrigerating systems of the form shown in Figs. 1 to 3.

Referring to the drawings and more particularly to Fig. 1, there is shown a refrigerator including a cabinet 20 having a machine compartment 21 in its lower portion and a food compartment 22 in its upper portion which is bounded by a sheet metal inner liner 23 supported at its front edges by a door molding 24 as shown in Fig. 3. This door molding 24 is fastened to the door jamb frame 25, which, like the door molding, is made of wood or some other suitable material having low heat conductivity. The inner liner is surrounded by outer metal walls 26 and between the inner liner and the outer metal walls is provided insulating means 27 in the form of insulation panels 28, 29, 30, and 31 which are formed of rectangular frames 32 made of wood or other suitable material which are fastened together so as to support a plurality of sheets 33 in spaced relation so as to provide dead air spaces between the sheets. Preferably, some or all of these sheets have bright metallic heat reflecting surfaces such as that provided by bright aluminum foil.

In order to maintain the food compartment 22 at a proper food preserving temperature it is necessary to remove the heat which leaks into the cabinet. The principal source of the heat leaking into the cabinet is the heat which passes through the walls of the cabinet. Other sources of heat are the placing of relatively warm articles of food in the cabinet and the infiltration of warm air into the cabinet when the door is open. Heretofore it has been customary to cool such a cabinet by placing an evaporator within the food compartment. In order to remove the heat which entered the food compartment through the walls of the cabinet it was necessary that this heat first passed the barrier of the insulation. While the insulation prevented a considerable portion of heat from entering the cabinet it did permit a small portion to pass through. This small portion of heat was transferred to the inner liner. The inner liner then transferred heat to the air within the food compartment while the evaporator within the food compartment cooled the air within the food compartment to prevent the temperature of the air within the food compartment from rising above a safe limit. Because of the many heat transfers and because air is a poor conductor of heat and cold, it was necessary to maintain the evaporator at a relatively low temperature, considerably below the temperature of the inner liner. Inasmuch as it was necessary to operate the evaporator at a relatively low temperature the efficiency and the capacity of the system was reduced. The accumulation of frost due to the relatively low temperature of the evaporator further reduced the efficiency of the refrigerating system. In addition, this already objectionable situation also caused the dehydration of certain foods within the refrigerator cabinet and caused them to become wilted.

In my refrigerator, in order to avoid such a situation I provide intercepting heat conducting sheet metal plates of heat transfer means 36 and 37 each of which enclose a portion of the inner liner and which extend between the inner liner and the insulating means on the sides, top, bottom and rear walls so that any heat which leaks through the insulation is intercepted by this heat conducting means. The two dotted lines running down the center of Fig. 1 illustrate the adjacent edges of the rear wall portions of the metal plates 36 and 37. The intercepting means are preferably made of a material having high heat conducting and reflecting properties, such as bright aluminum so that they act as an insulator as well as an efficient heat removing means. The intercepting heat conducting means are provided with folds at the vertical edges of the inner liner. These folds at the rear portions of the cabinet are in the form of loops 38 and 39, while at the front vertical edges of the cabinet there is provided curled edges 40 and 41. These looped and curled edges fit tightly around the vertical volatile liquid or refrigerant ducts or tubes 42, 43, 44, and 45 which form a part of a secondary refrigerant system which removes the heat through the metal to metal contact from the heat transfer members 36 and 37. While the heat transfer members 36 and 37 sufficiently tightly fit the ducts or tubes 42, 43, 44 and 45 to provide good heat transfer, the connections are not so tight as to prevent the withdrawal of the ducts. Thus the secondary evaporator along with the four ducts or tubes may be removed by withdrawing the ducts vertically upwardly so that the four ducts are in a sliding manner pulled out of the loops 38 and 39 as well as the curled edges 40 and 41 of the heat transfer members 36 and 37. At the top of these vertical tubes which form a part of the secondary system is a flat container 46 formed of sheet metal and having its interior in open communication with the vertical tubes. Within this flat container is a primary refrigerant evaporator 47 formed of tubing which extends in a serpentine fashion from one side of the container to the other. The container is partially filled with a volatile liquid and floods the vertical refrigerant ducts or tubes 42, 43, 44, and 45. This volatile liquid preferably is a low pressure refrigerant, for example, trichloromonofluoromethane or dichlorotetrafluoroethane, so that there is little likelihood of any damage thereto which would permit a serious or dangerous leak. This volatile liquid evaporates within the vertical ducts or tubes because of the absorption of heat from the sheet metal heat transfer members 36 and 37 and this vapor is condensed upon the surfaces of the primary evaporator 47.

The primary evaporator 47 is supplied with liquid refrigerant from a refrigerant liquefying apparatus located in the machine compartment 21 and comprising a compressor 50, for compressing the refrigerant and for forwarding the primary refrigerant to a condenser 51 where the primary refrigerant is condensed and collected in a receiver 52. From the receiver 52 the liquid refrigerant is forwarded through a supply conduit 53 to a refrigerant expansion valve 54 located at the entrance of the evaporator 47 for controlling the supply of liquid refrigerant thereto. The primary liquid refrigerant vaporizes within the evaporator 47 thereby condensing the secondary volatile liquid or refrigerant and the resulting primary refrigerant vapor is returned to the compressor 50 through the return conduit 55. The compressor 50 is operated by an electric motor 56 through pulley and belt means 57 under the control of an electric switch 58. The electric switch 58 is operated by thermostat 59 which is fastened to the top and rear walls of the inner liner 23. The thermostat 59 is connected to the switch 58 by a tube 60.

By this arrangement the temperature of the air within the food compartment 22 is controlled by the thermostat 59 which in turn controls the operation of the switch 58 and the primary refrigerating system so that both the primary and the secondary refrigerating systems maintain such a temperature of the heat transfer members 36 and 37 that a proper temperature is maintained within the food compartment 22. Also, the heat which leaks through the insulation is intercepted before it reaches the inner liner and the food storage compartment and no space is required in the food compartment for an evaporator while the frosting of the evaporator and the reduction in efficiency resulting from the arrangement used in prior refrigerators is avoided.

In Fig. 5 there is shown a cabinet 70 having an inner liner 71 and intercepting heat transfer members 72 and 73 which are similar to the heat transfer members 36 and 37. At the top of the inner liner 71 and directly in contact therewith is a flat rectangular container 74 containing a primary evaporator 75 and containing a volatile secondary liquid and vapor. The flat container 74 also has vertical tubes or ducts in open communication therewith and in heat exchange relationship with the heat exchange members 72 and 73. The primary evaporator 75 is supplied with liquid refrigerant by a refrigerant liquefying apparatus similar to that shown in the machine compartment 21 of Fig. 1 under the control of a thermostat 76 fastened to the upper rear portion of the food compartment liner 71. With this construction, better metal to metal heat transfer is obtained between the container 74 and the inner liner as well as between the vertical tubes and the heat transfer members 72 and 73 than in the construction shown in Figs. 1 to 4 inclusive.

Figure 6:
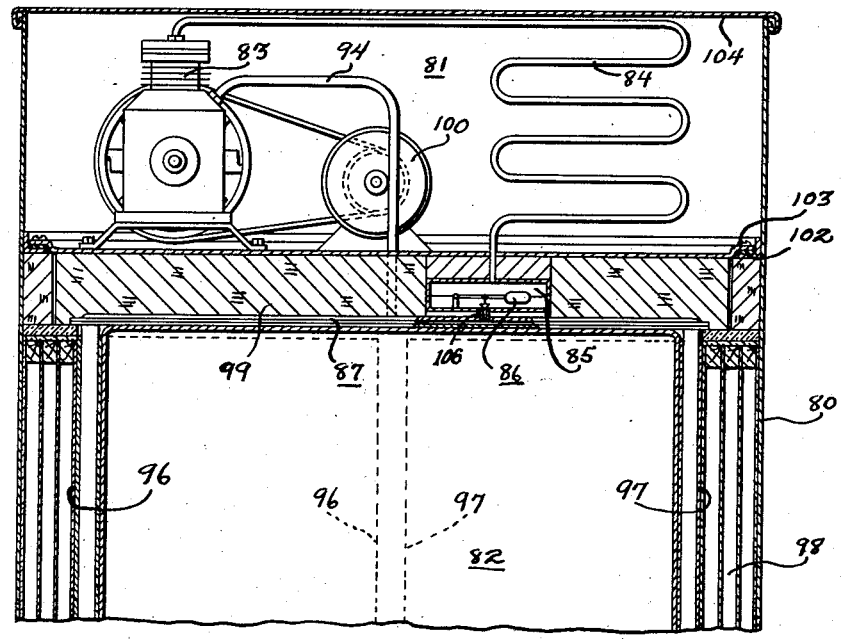
Fig. 6 is a fragmentary vertical sectional view showing another modified form of my invention in which the refrigerant condensing means is at the top of the cabinet.
Figure 7:
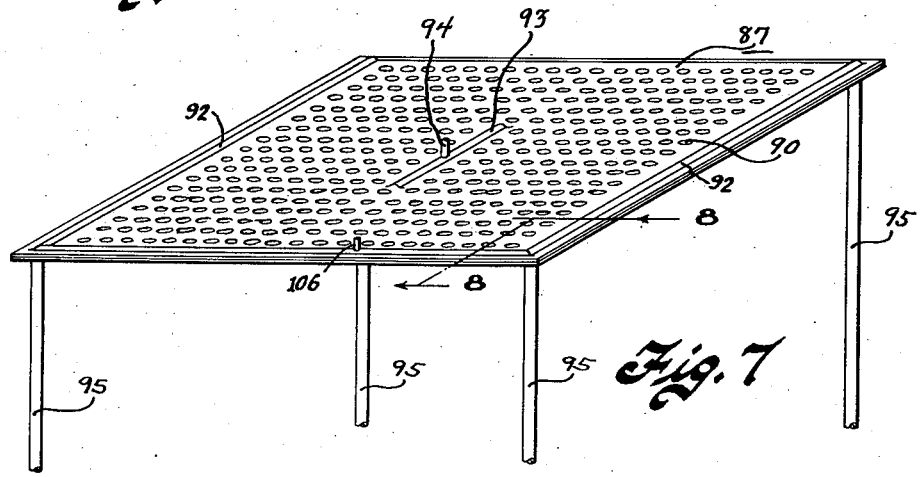
Fig. 7 is a perspective view of a portion of the refrigerant evaporator shown in Fig. 6.
Figure 8:
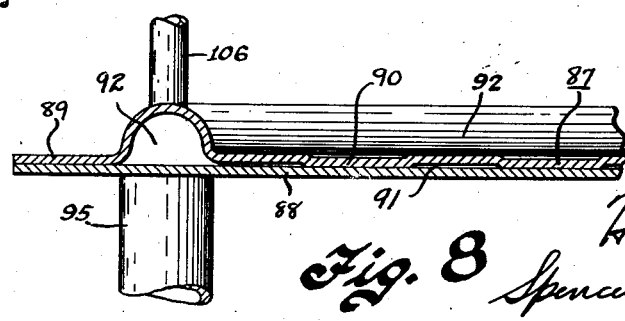
Fig. 8 is a sectional view on the line 8—8 of Fig. 7.

In Figs. 6 to 8 inclusive there is shown a modification in which only a primary evaporating system is used. In this system there is provided a cabinet 80 having a machine compartment 81 at the top of the cabinet, and a food compartment 82 in the lower portion of the cabinet. The machine compartment 81 contains a refrigerant liquefying apparatus including a compressor 83 driven by an electric motor 100 for compressing the refrigerant and for forwarding the compressed refrigerant to a condenser 84 where the compressed refrigerant is liquefied and collected in a chamber 85 which contains a high side float mechanism 86 which controls the supply of liquid refrigerant through the connecting tube 106 to the evaporating means 87 better shown in Figs. 7 and 8.

The primary evaporating means 87 comprises a generally flat plate structure comprising a flat bottom sheet 88, and a deformed top sheet 89 which is welded to the bottom sheet 88 around the edges as well as at a plurality of the spots 90 between the edges of the sheets. Surrounding the welded spots 90 are very thin refrigerant spaces 91 which communicate with the passage 92 formed between the sheets and extending around the edges of the plate structure. These thin refrigerant spaces 91 are also connected with a discharge chamber 93 in the center portion of the plate structure where the evaporated refrigerant collects and is returned to the compressor through the return conduit 94. Connected to the passage 92 which extends around the edges of the plate structure are the vertical tubes 95 located at the corners of the plate structure and extending adjacent the vertical edges of the inner liner 82. These vertical tubes 95 are in heat exchange relation by means of a folded or looped construction with the heat transfer sheet metal members 96 and 97 which surround the inner liner and intercept any heat which leaks through the insulating means 98 so as to maintain the space between the inner liner at a proper refrigerating temperature. The flat bottom sheet 88 of the evaporator is in direct contact with the top of the inner liner.

This evaporator structure is mounted upon the bottom of an insulated removable wall portion 99 of the refrigerator cabinet which also supports on its upper side the refrigerant liquefying apparatus. This removable wall portion 99 is fastened to and sealed to the outer wall of the cabinet by a rubber gasket 102 and fastening means 103. The cover 104 covers the top of the machinery compartment 81 but is removable so that the entire refrigerating system, excepting the heat transfer members 96 and 97 as well as the top wall structure 91, may be removed from the cabinet as a unit independently of the inner liner and the other portions of the refrigerator cabinet.

In this removal of the refrigerating system, the heat transfer sheet metal members 96 and 97 remain in place surrounding the inner liner while the vertical tubes 95 are pulled out of the loops and curled edges of the heat transfer members 96 and 97 in a sliding manner.

This form incorporates the entire evaporating means in the primary evaporator and cools both the inner liner and the intercepting sheet metal heat transfer members. In this way a cooling arrangement very favorable to excellent preservation of meats and vegetables is provided.

While the form of embodiment of the invention as herein disclosed constitutes a preferred form, it is to be understood that other forms might be adopted, all coming within the scope of the claims which follow.

What is claimed is as follows:

1. Refrigerating apparatus including a plurality of walls surrounding a space to be kept cool, insulating means surrounding the walls, and refrigerating means having an intercepting portion extending between the walls and the insulating means for intercepting any heat leaking through the insulating means, said intercepting portion having a heat reflecting surface for aiding the insulating means in reflecting heat.

2. Refrigerating apparatus including a plurality of walls surrounding a space to be kept cool, insulating means surrounding the walls, and refrigerating means having an intercepting portion extending between the walls and the insulating means for intercepting any heat leaking through the insulating means, said intercepting portion being formed of a means having high heat conducting and high heat reflecting properties.

3. Refrigerating apparatus including a plurality of walls surrounding a space to be kept cool, insulating means surrounding the walls, and refrigerating means having an intercepting portion extending between the walls and the insulating means for intercepting any heat leaking through the insulating means, said intercepting portion being made of bright aluminum.

4. Refrigerating apparatus including rectangular box-shaped inner walls enclosing a compartment to be kept cool, insulating means enclosing said walls, refrigerating means comprising a liquefying means and an evaporating means having portions extending between the box-shaped walls and the insulating means and covering entire wall portions of said box-shaped walls, said evaporating means constituting an independent element structurally independent of said rectangular box-shaped inner walls.

5. Refrigerating apparatus including rectangular box-shaped inner walls enclosing a compartment to be kept cool, insulating means enclosing said walls, said insulating means including a removable portion having a refrigerant liquefying means on its outer side and a flat sheet metal plate type evaporating means extending across its inner face and extending over and in direct contact with a wall portion of the box-shaped inner walls, said sheet metal plate type evaporating means constituting a separate element independent of said box-shaped inner walls.

6. Refrigerating apparatus including a cabinet having inner and outer walls and insulating means between the inner and outer walls, said insulating means being located adjacent the outer walls, said inner walls enclosing a compartment to be kept cool, refrigerating means including a refrigerant liquefying means and a refrigerant evaporating means, said refrigerant evaporating means constituting a separate element structurally independent of the inner walls, said refrigerant evaporating means including sheet means extending between said insulating means located adjacent the outer walls and said inner walls for intercepting heat passing through the insulating means.

7. Refrigerating apparatus including rectangular box-shaped inner sheet-metal walls enclosing a compartment to be kept cool, insulating means surrounding said inner sheet-metal walls, said insulating means being provided with a removable section directly above the top wall of said inner sheet-metal walls, said removable section being provided with a refrigerating system including a refrigerant liquefying means on its upper side and a refrigerant evaporating means on its lower side, said refrigerant evaporating means being located in heat exchange relationship with the top wall of the inner sheet-metal walls.

8. Refrigerating apparatus including a cabinet containing rectangular box-shaped sheet metal inner walls enclosing a space to be kept cool, insulating means surrounding the inner walls, outer walls surrounding said insulating means, and refrigerating means constituting a separate element structurally independent of the sheet metal inner walls, said refrigerating means having sheet metal means with flat portions extending between and parallel to the inner walls and the insulating means and being in contact with and in heat exchange relation with the metal inner walls, the insulating means adjacent said flat portions being in close proximity to the outer walls of the cabinet.

9. Refrigerating apparatus including sheet metal inner walls enclosing a space to be kept cool, said inner walls having a flat portion, insulating means surrounding the inner walls, said insulating means including a removable portion, and a refrigerating system having a compressing and condensing means mounted upon one side of the removable portion and an evaporating means upon the other side of the removable portion, said evaporating means including a flat portion in contact with and parallel to but independent from the flat portion of the inner walls, said evaporating means constituting a separate element structurally independent of the sheet metal inner walls, said flat portion of the evaporating means being normally located directly between the flat portion of the sheet metal inner walls and the removable portion of the insulating means.

10. Refrigerating apparatus including sheet metal inner walls enclosing a space to be kept cool, insulating means surrounding the inner walls, and refrigerating means having sheet metal means extending directly between and parallel to the inner walls and the insulating means for intercepting any heat leaking through the insulating means and also having means in heat exchange relation with the metal inner walls to cool the inner walls and thereby cool the atmosphere in the space kept cool, said refrigerating means constituting a separate element structurally independent of the sheet metal inner walls.

11. Refrigerating apparatus including rectangular box-shaped inner sheet metal walls enclosing a compartment to be kept cool, insulating means surrounding said inner sheet metal walls, said insulating means being provided with a removable section directly above the top wall of said inner sheet metal walls, said removable section being provided with a refrigerating system including a refrigerant liquefying means on its upper side and a refrigerant evaporating means on its lower side, said refrigerant evaporating means being in the form of a flat plate-type refrigerating element resting directly upon the top wall of the inner sheet metal wall.

12. Refrigerating apparatus including a plurality of walls surrounding a space to be kept cool, insulating means surrounding the walls, and refrigerating means formed into a plurality of separable portions, one of which may be separated from another, one of said separable portions extending between and parallel to the walls and the insulating means for intercepting any heat leaking through the insulating walls, said portion extending between the walls constituting a separate element structurally independent of the sheet metal inner walls.

13. Refrigerating apparatus including a plurality of walls surrounding a space to be kept cool, insulating means surrounding the walls, and refrigerating means comprising a refrigerant liquefying means and a refrigerant evaporating means, said refrigerant evaporating means being formed into a plurality of separable portions capable of being separated, one of said separable portions including a sheet metal intercepting means extending between and parallel to the walls and the insulating means for intercepting any heat leaking through the insulating means, said intercepting means surrounding said walls, the remaining portion of the refrigerant evaporating means being removable from the cabinet independently of said intercepting means, said intercepting means constituting a separate element structurally independent of the walls.

HARRY F. SMITH.